United States Patent
Heuer

(10) Patent No.: US 7,547,755 B2
(45) Date of Patent: Jun. 16, 2009

(54) (CO)POLYCARBONATES HAVING IMPROVED ADHESION TO METALS

(75) Inventor: Helmut-Werner Heuer, Krefeld (DE)

(73) Assignee: Bayer Material Science AG (DE)

( * ) Notice: Subject to any disclaimer, the term of this patent is extended or adjusted under 35 U.S.C. 154(b) by 0 days.

(21) Appl. No.: 11/903,733

(22) Filed: Sep. 24, 2007

(65) Prior Publication Data

US 2008/0081896 A1    Apr. 3, 2008

(30) Foreign Application Priority Data

Sep. 28, 2006    (DE) ............... 10 2006 046 330

(51) Int. Cl.
*C08G 64/00* (2006.01)
*C08G 63/02* (2006.01)

(52) U.S. Cl. ............ 528/196; 524/155; 524/156; 524/494; 524/500; 524/504; 524/505; 528/198; 536/17.1; 536/17.2; 536/17.9; 548/312.7

(58) Field of Classification Search .......... 536/17.2, 536/17.9, 17.1; 548/312.7; 528/196, 198; 524/155, 156, 494, 500, 504, 505

See application file for complete search history.

(56) References Cited

U.S. PATENT DOCUMENTS

| 2005/0222334 A1 | 10/2005 | Srinivasan et al. .......... 525/178 |
| 2005/0228137 A1 | 10/2005 | Srinivasan et al. .......... 525/186 |

FOREIGN PATENT DOCUMENTS

| DE | 488 760 | 1/1930 |
| EP | 1582549 | * 10/2005 |
| WO | 2007/136934 | 11/2007 |

OTHER PUBLICATIONS

Synthetic Communications, 29(19), (month unavailable) 1999, p. 3303-3311, Hyun Nam Song et al, "Friedel-Crafts Type Reactions of Some Activated Cyclic Ketones with Phenol Derivatives".

* cited by examiner

*Primary Examiner*—Terressa M Boykin
(74) *Attorney, Agent, or Firm*—Connolly Bove Lodge & Hutz LLP

(57) ABSTRACT

A (co)polycarbonate the molecular structure of which contains units derived from bisphenols conforming to formulae $(1a_1)$ and $(1b_1)$

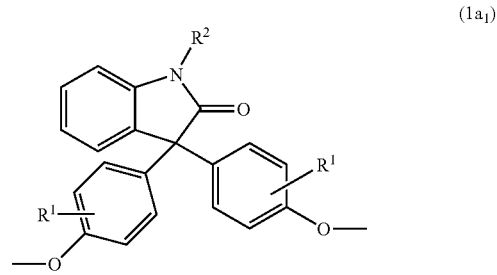

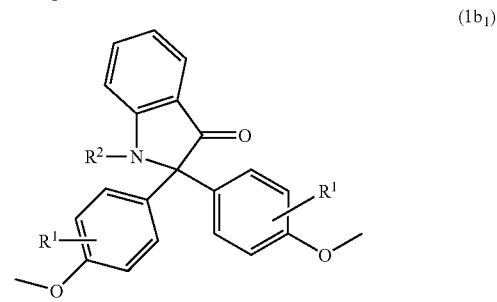

in which $R^1$ independently of one another represents hydrogen or a $C_1$-$C_{10}$-alkyl and $R^2$ represents $C_1$-$C_{10}$-alkyl, or phenyl or benzyl in each case unsubstituted or substituted by at least one member selected from the group consisting of hydrogen and $C_1$-$C_{10}$-alkyl radical.

The (co)polycarbonate exhibits relatively high glass transition temperature and improved adhesion to metals.

20 Claims, No Drawings

(CO)POLYCARBONATES HAVING IMPROVED ADHESION TO METALS

FIELD OF THE INVENTION

The invention relates to a thermoplastic molding composition and in particular to a composition containing (co)polycarbonate.

BACKGROUND OF THE INVENTION

Aromatic polycarbonates belong to the group of industrial thermoplastics. They are distinguished by combination of the technologically important properties of transparency, heat distortion resistance and toughness.

To obtain high molecular weight polycarbonates by the phase interface process, the alkali metal salts of aromatic dihydroxy compounds (herein referred to as bisphenols) are reacted with phosgene in the two-phase mixture. The molecular weight may be controlled by the amount of monophenols, such as e.g. phenol or tert-butylphenol. Practically exclusively linear polymers are formed in these reactions. This may be demonstrated by end group analysis. By targeted use of so-called branching agents, as a rule polyhydroxylated compounds, branched polycarbonates are also obtained in this context.

For the preparation of polycarbonates by the phase interface process, reference may be made by way of example to H. Schnell, Chemistry and Physics of Polycarbonates, Polymer Reviews, vol. 9, Interscience Publishers, New York 1964 p. 33 et seq. and to Polymer Reviews, vol. 10, "Condensation Polymers by Interfacial and Solution Methods", Paul W. Morgan, Interscience Publishers, New York 1965, chap. VIII, p. 325.

For the preparation of polycarbonates by the melt transesterification process, the bisphenols are reacted in the melt with diaryl carbonates, usually diphenyl carbonate, in the presence of catalysts, such as alkali metal salts or ammonium or phosphonium compounds.

The melt transesterification process is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964) and DE-C 10 31 512.

Polycarbonates based on 2-hydrocarbyl-3,3-bis(4-hydroxyaryl)phthalimidines as monomers, which may be prepared by synthesis from phenolphthalein and an aniline hydrochloride derivative in aniline, are known from EP-A 1 582 549. This preparation is very involved and does not proceed satisfactorily. This bisphenol class thus has the industrial disadvantage of being accessible in only a very cumbersome manner.

However, due to their lack of adhesion to metals, the polycarbonates and copolycarbonates already described in the prior art have the disadvantage that they may have only a limited suitability or a suitability which is not optimum for use as a metallized component in e.g. high temperature uses.

SUMMARY OF THE INVENTION

A (co)polycarbonate the molecular structure of which contains units derived from bisphenols conforming to formulae $(1a_1)$ and $(1b_1)$

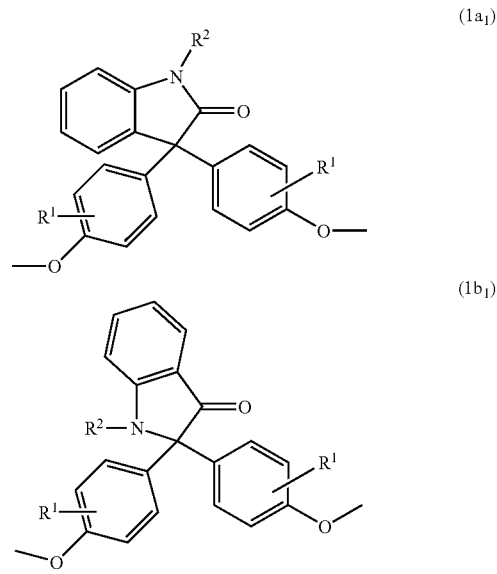

in which
R$^1$ independently of one another represents hydrogen or a $C_1$-$C_{10}$-alkyl radical and R$^2$ represents $C_1$-$C_{10}$-alkyl, furthermore a phenyl or benzyl in each case unsubstituted or substituted by at least one member selected from the group consisting of hydrogen and $C_1$-$C_{10}$-alkyl.

The (co) polycarbonate exhibits relatively high glass transition temperature and improved adhesion to metals.

DETAILED DESCRIPTION OF THE INVENTION

There was therefore the object of providing polycarbonates or copolycarbonates and processes for the preparation thereof which avoid these disadvantages. This object has been achieved, surprisingly, by the use of the class of bisphenols of the general formulae (1a) and (1b) (isomer mixture) (also called bisphenols of the formula (1) in the following)

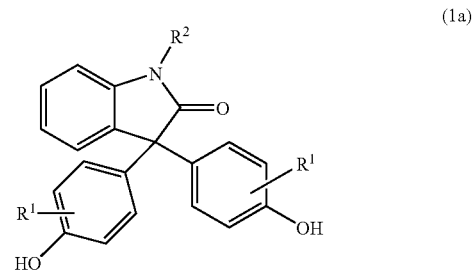

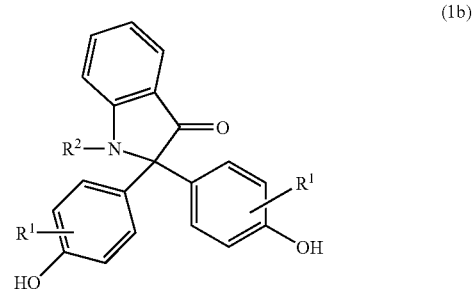

in which $R^1$ independently of one another represents hydrogen or $C_1$-$C_{10}$ alkyl, particularly preferably hydrogen or $C_1$-$C_6$ alkyl, particularly preferably hydrogen or $C_1$-$C_4$ alkyl, very particularly preferably hydrogen or methyl, $R^2$ represents $C_1$-$C_{10}$ alkyl in each case unsubstituted or substituted phenyl or benzyl, preferably $C_1$-$C_6$ alkyl, phenyl or benzyl, particularly preferably $C_1$-$C_4$ alkyl, phenyl or benzyl, in particular methyl, phenyl or benzyl wherein the radicals mentioned for $R^1$ are preferred as substituents for phenyl and benzyl.

Alkyl mentioned in the present application may be linear or branched

Particularly preferably, $R^2$ represents phenyl which may optionally be substituted by the radicals mentioned in $R^1$, represented by the formula (1c) and (1d) (isomer mixture)

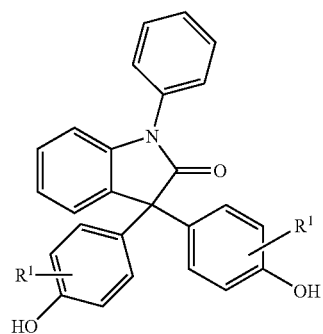
(1c)

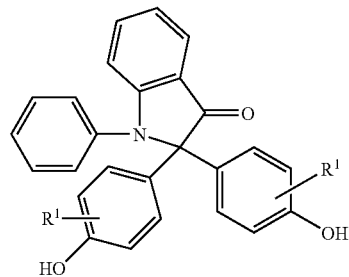
(1d)

wherein
$R^1$ has the abovementioned meaning.

The bisphenol of the formula (1e) and (1f) (isomer mixture)

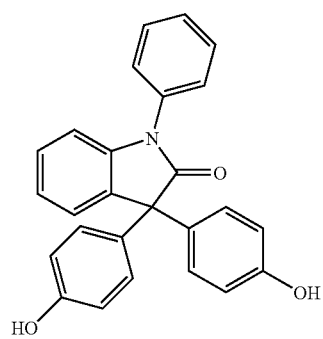
(1e)

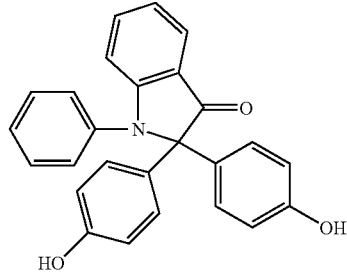
(1f)

is very particularly preferred.

These bisphenols of the formula (I) according to the invention may be prepared from phenol derivatives and N-substituted isatin derivatives in an acid-catalyzed reaction. This may be carried out by means of reactions analogous to that which is described for the preparation of unsubstituted isatin-bisphenols (H. N. Song et al., Synthetic Communications 1999, 29 (19), 3303 and R. Berendes, H. Klös, Patent Specification No. 488760, Patent Office of the German Reich 1930).

The synthesis of the bisphenols according to the invention is preferably carried out as a condensation reaction of corresponding phenols and isatin derivatives, as the following example shows:

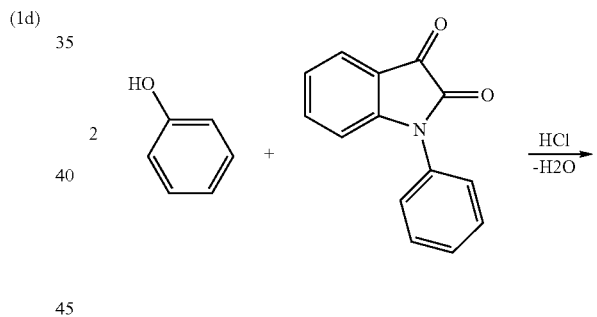

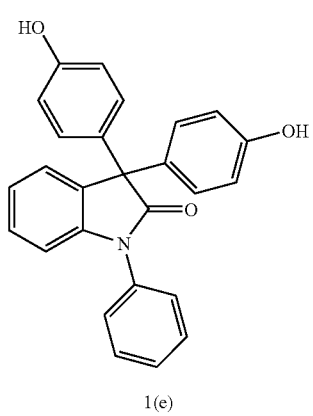

1(e)
3,3-bis(4-hydroxyphenyl)-1-phenyl-1H-indol-2-one

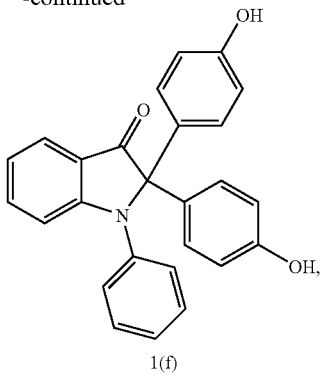

1(f)
2,2-bis(4-hydroxyphenyl)-1-phenyl-1H-indol-3-one an isomer mixture being obtained.

Very particularly preferably, the condensation is carried out with hydrochloric acid as the acid catalyst at temperatures of between 0 and 60° C. with a stoichiometric ratio of phenol derivative to ketone derivative of 10 to 1, a mercaptan or thiocarboxylic acid compound (e.g. dodecylmercaptan, mercaptopropionic acid or thioacetic acid) preferably being present as a sulfur-containing compound, preferably only in an amount of about 0.01 to 25%, based on the ketone compound. The hydrochloric acid is very particularly preferably passed in as HCl gas.

The condensation may be carried out in substance or in solution. In this context, inert solvents, such as, for example, chlorinated hydrocarbons, such as methylene chloride or dichloroethane, or toluene, xylenes or chlorobenzenes, are employed.

The reaction is particularly preferably carried out in substance with an excess of phenol.

A further synthesis possibility for the preparation of N-phenylisatin is the use of commercially obtainable isatin (e.g. from BASF AG) in the form of an N-arylation reaction. The following organometallic syntheses known from the literature are available in this context.

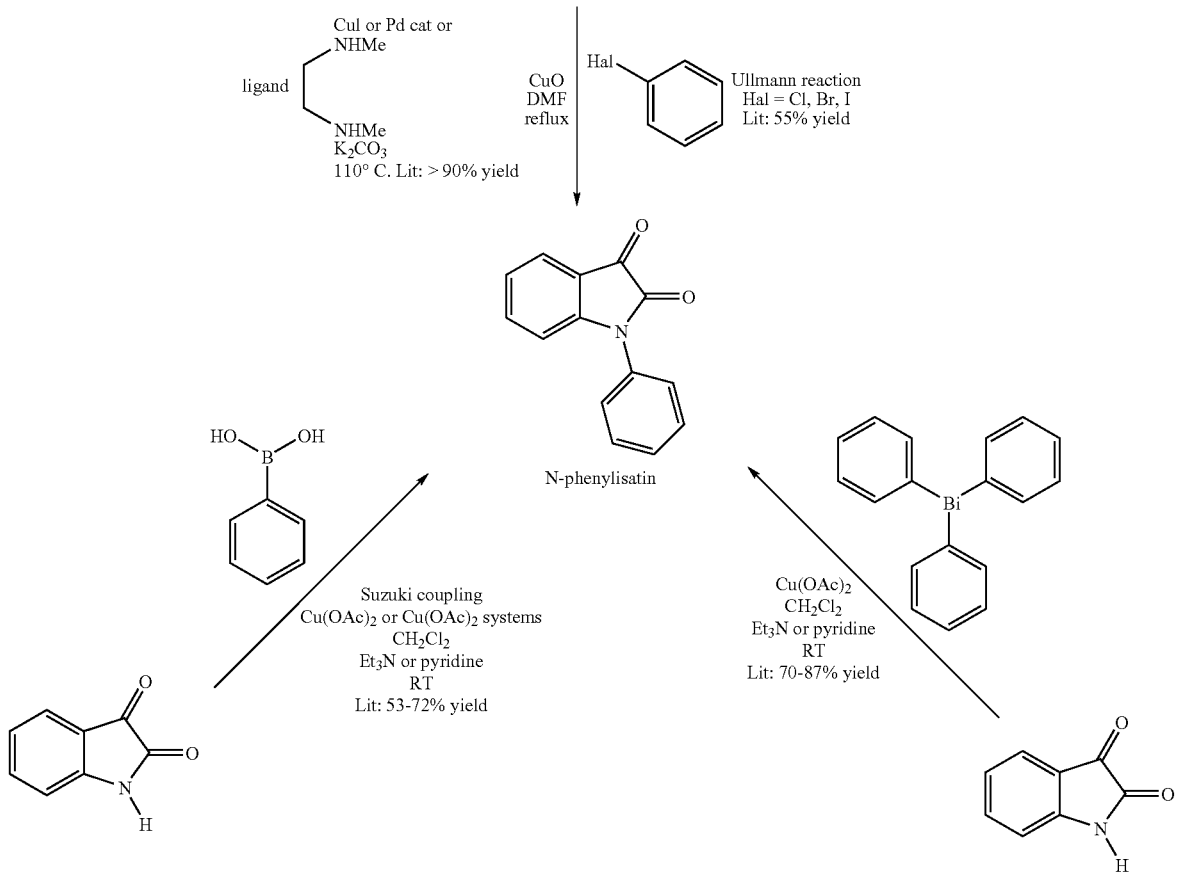

A further synthesis possibility for the preparation of N-phenylisatin is the use of the isonitrosoacetanilide isatin process (formerly for the preparation of indigo, Traugott Sandmeyer, Geigy Basel 1919). The following reaction steps are carried out in this:

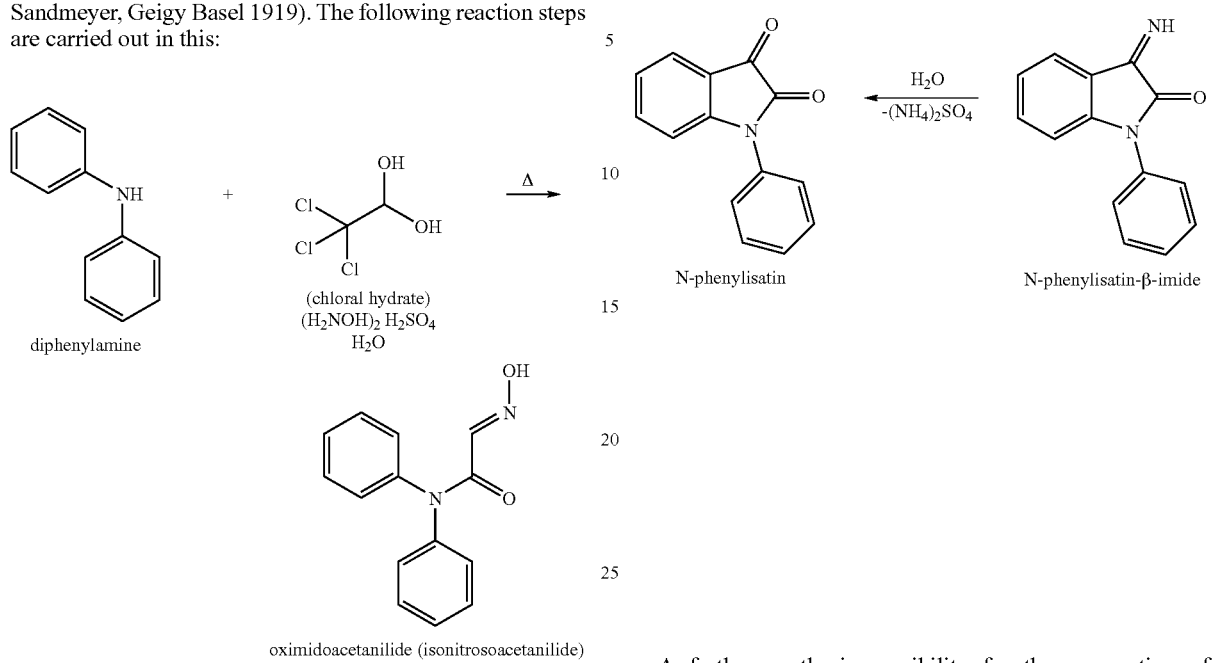

A further synthesis possibility for the preparation of N-phenylisatin is via the reaction stage of a nitrone. The following reaction steps are carried out in this:

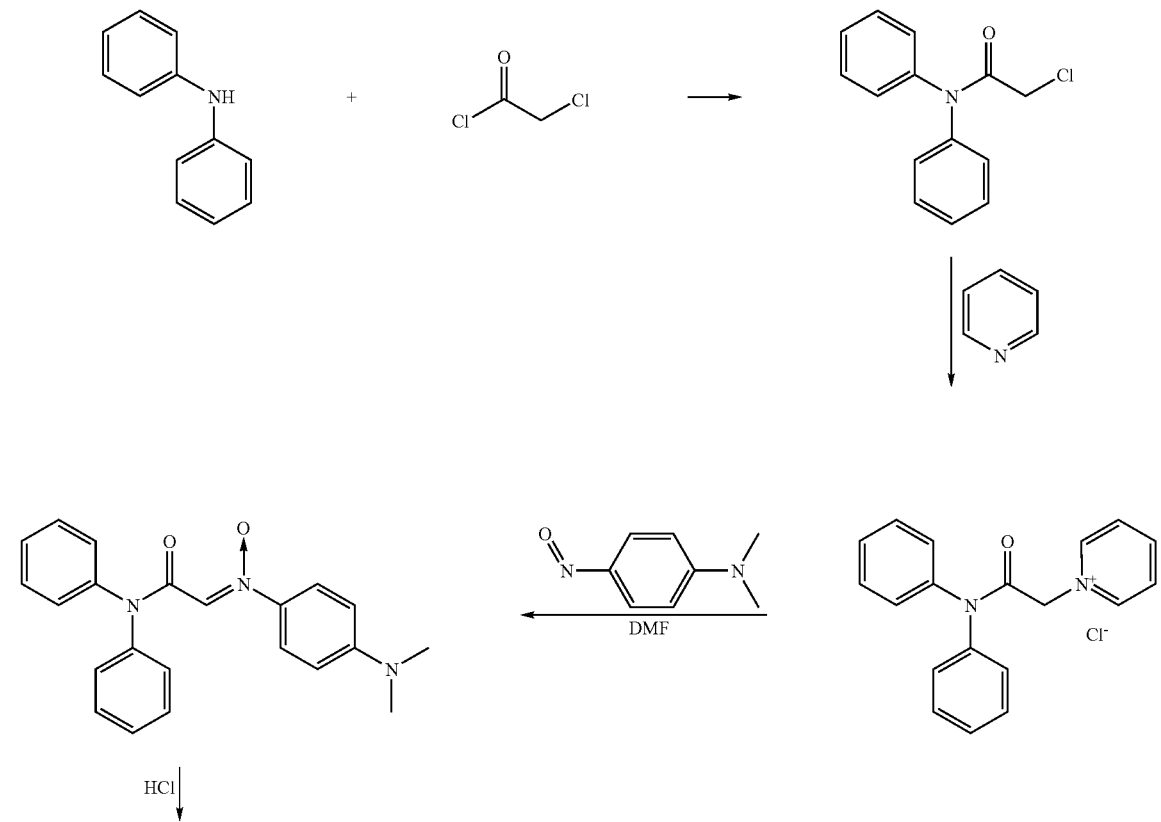

-continued

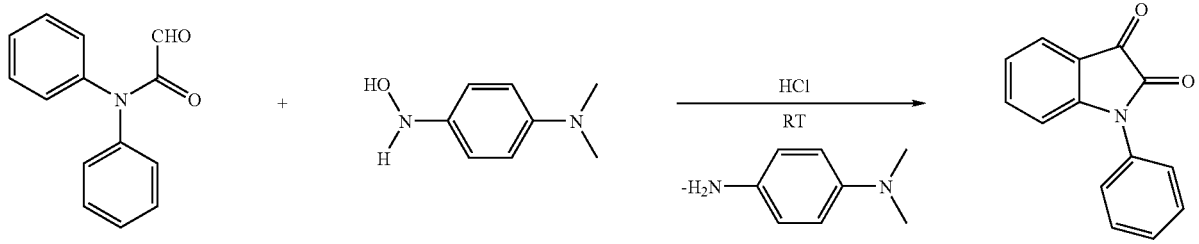

The phenols employed are known or may be prepared by processes known from the literature, for example by Friedel Crafts alkylation (Organikum, Organish-chemisches Grundpraktikum, corrected reprint of the 20th edition, Wiley-VCH, Weinheim, p. 355, 1999). Very many phenols are also commercially obtainable (suppliers e.g. Aldrich, Fluka, Acros etc.).

The isatin derivatives used are likewise known or may be prepared by processes known from the literature, for example by alkylation of the corresponding isatin parent substance. For example, they are accessible from the corresponding sodium or potassium salts of the isatin parent substance by reaction with alkyl halides in absolute alcohol (G. Heller, O, Nötzel, Ber. Dtsch. Chem. Ges. 1907, 40, 1294). An alternative synthesis possibility is offered by alkylation via O-alkylated isourea derivatives (E. Vowinkel, Chem. Ber. 1966, 99, 1479, or L. J. Mathia, Synthesis 1979, 561). These may be obtained by reaction of N,N'-dicyclohexylcarbodiimide with an alcohol in the presence of copper(I) chloride (E. Schmidt, F. Moosmüller, Liebigs Ann. Chem. 1955, 597, 235). Some N-substituted isatins are also commercially obtainable (suppliers e.g. ChemPur GmbH, Karlsruhe, Germany or Alfa Aesar, Karlsruhe, German or Sigma-Aldrich or Lancaster Synthesis Ltd. Newgate, United Kingdom).

The present invention likewise provides polycarbonates or copolycarbonates (herein (co)polycarbonates) which are prepared using the bisphenols according to the invention, and the corresponding preparation processes.

The (co)polycarbonates according to the invention are based on bisphenols of the general formulae $(1a_1)$ and $(1b_1)$ (isomer mixture) as a recurring monomer unit

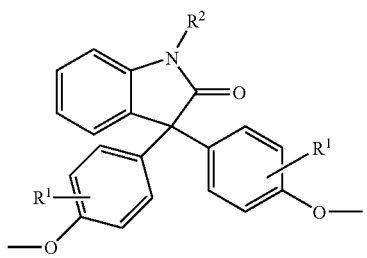 $(1a_1)$

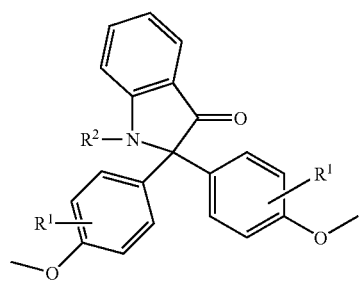 $(1b_1)$ wherein
$R^1$ and $R^2$ have the abovementioned meaning.

Preferred bisphenols are likewise those mentioned above.

In the case of (co)polycarbonates, in addition to one or more bisphenols of the formula (1), these may contain as a further monomer unit bisphenols of the formula (2)

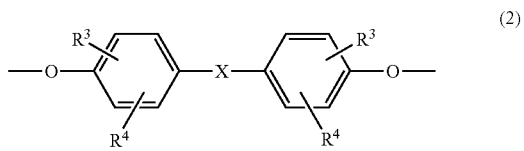 (2)

in which
$R^3$ and $R^4$ independently of one another represent H, $C_1$-$C_{18}$-alkyl, $C_1$-$C_{18}$-alkoxy, halogen, such as Cl or Br, or in each case optionally substituted aryl or aralkyl, preferably H or $C_1$-$C_{12}$-alkyl, particularly preferably H or $C_1$-$C_8$-alkyl and very particularly preferably H or methyl, and X represents a single bond, —$SO_2$—. —CO—, —O—, —S—, $C_1$- to $C_6$-alkylene, $C_2$- to $C_5$-alkylidene or $C_5$- to $C_6$-cycloalkylidene, which may be substituted by $C_1$- to $C_6$-alkyl, preferably methyl or ethyl, or furthermore $C_6$- to $C_{12}$-arylene, which may optionally be fused with further aromatic rings containing hetero atoms.

Preferably, X represents a single bond, $C_1$ to $C_5$-alkylene, $C_2$ to $C_5$-alkylidene, $C_5$ to $C_6$-cycloalkylidene, —O—, —SO—, —CO—, —S—, —$SO_2$— or a radical of the formula (1b)

 (1b)

$R^5$ and $R^6$ may be chosen individually for each $X^1$ and independently of one another denote hydrogen or $C_1$ to $C_6$-alkyl, preferably hydrogen, methyl or ethyl, and $X^1$ denotes carbon and m denotes an integer from 4 to 7, preferably 4 or 5, with the proviso that on at least one atom $X^1$, $R^5$ and $R^6$ are simultaneously alkyl.

Examples which are mentioned of the diphenols of the formula (2) which may be employed in addition to the bisphenols of the formula (1) according to the invention are hydroquinone, resorcinol, dihydroxybiphenyls, bis-(hydroxyphenyl)-alkanes, bis-(hydroxyphenyl)-cycloalkanes, bis-(hydroxyphenyl) sulfides, bis-(hydroxyphenyl) ethers, bis- (hydroxyphenyl) ketones, bis-(hydroxyphenyl) sulfones, bis-(hydroxyphenyl)sulfoxides, α,α'-bis-(hydroxyphenyl)-diisopropylbenzenes and compounds thereof alkylated on the nucleus and halogenated on the nucleus, and also α,ω-bis-(hydroxyphenyl)-polysiloxanes.

Preferred diphenols of the formula (2) are, for example, 4,4'-dihydroxybiphenyl (DOD), 4,4'-dihydroxybiphenyl ether (DOD ether), 2,2-bis-(4-hydroxyphenyl)-propane (bisphenol A), 1,1-bis-(4-hydroxyphenyl)-3,3,5-trimethylcyclohexane (bisphenol TMC), 1,1-bis-(4-hydroxyphenyl)-cyclohexane, 2,4-bis-(4-hydroxyphenyl)-2-methylbutane, 1,1-bis-(4-hydroxyphenyl)-1-phenylethane, 1,1-bis[2-(4-hydroxyphenyl)-2-propyl]-benzene, 1,3-bis[2-(4-hydroxyphenyl)-2-propyl]-benzene (bisphenol M), 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulfone, 2,4-bis-(3,5-dimethyl-4-hydroxyphenyl)-2-methylbutane, 2,2-bis-(3,5-dichloro-4-hydroxyphenyl)-propane and 2,2-bis-(3,5-dibromo-4-hydroxyphenyl)-propane.

Particularly preferred bisphenols are, for example, 2,2-bis-(4-hydroxyphenyl)-propane (bisphenol A), 4,4'-dihydroxybiphenyl (DOD), 4,4'-dihydroxybiphenyl ether (DOD ether), 1,3-bis[2-(4-hydroxyphenyl)-2-propyl]-benzene (bisphenol M), 2,2-bis-(3,5-dimethyl-4-hydroxyphenyl)-propane, 1,1-bis-(4-hydroxyphenyl)-1-phenylethane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

2,2-Bis-(4-hydroxyphenyl)-propane (bisphenol A), 4,4'-dihydroxybiphenyl (DOD), 1,3-bis[2-(4-hydroxyphenyl)-2-propyl]-benzene (bisphenol M) and 1,1-bis-(4-hydroxyphenyl)-3,3,5-trimethylcyclohexane (bisphenol TMC) are very particularly preferred.

The bisphenols of the formula (1) may be used either alone or in a mixture with one another or in a mixture with one or more bisphenols of the formula (2); polycarbonates in the context of the present invention are to be understood as meaning both homopolycarbonates and copolycarbonates.

(Co-)Polycarbonates in general contain, in addition to a diphenol chosen from compounds of the formula (1), up to 95 mol %, preferably up to 80 mol %, particularly preferably 70 mol %, at least one further diphenol chosen from compounds of the formula (2) (based on the sum of the moles of diphenols employed). The minimum content of a diphenol chosen from compounds of the formula (2) is preferably 5 mol-%, particularly preferably 10 mol-% (based on the sum of the moles of diphenols employed). Particularly preferred copolycarbonates contain 40-60, in particular 45-55 mol % of diphenol of the formula (1) and 60-40, in particular 45-55 mol % of diphenol of the formula (2) (based on the sum of the moles of diphenols employed).

The copolycarbonate may also be prepared, in particular, from a mixture of three bisphenols, one originating from the class of N-substituted isatin-bisphenols and the other two originating from the bisphenols described above. This is very particularly preferably the combination of the bisphenol structure (1b) with bisphenol A and bisphenol TMC. In this context, compositions of 50 mol % of bisphenol A, 25 mol % of the bisphenol from the class of N-substituted isatin-bisphenols and 25 mol % of TMC are very particularly preferred.

The polycarbonates and copolycarbonates according to the invention in general have molecular weights (weight-average) of from 2,000 to 200,000, preferably 3,000 to 150,000, in particular 5,000 to 100,000, very particularly preferably 8,000 to 80,000, in particular 12,000 to 70,000 (determined by GPC with polycarbonate calibration).

The diphenols are known from the literature or may be prepared by processes known from the literature (see e.g. H. J. Buysch et al., Ullmann's Encyclopedia of Industrial Chemistry, VCH, New York 1991, 5th ed., vol. 19, p. 348).

The polycarbonates and copolycarbonates may also be branched. Certain small amounts, preferably amounts of between 0.05 and 5 mol %, particularly preferably 0.1 to 3 mol %, very particularly preferably 0.1 to 2 mol %, based on the moles of diphenols employed, of trifunctional compounds, such as e.g. isatin-biscresol (IBC) or phloroglucinol, 4,6-dimethyl-2,4,6-tri(4-hydroxyphenyl)-hep-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane (THPE); tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester; tetra-(4-hydroxyphenyl)-methane, tetra-(4-(4-hydroxyphenyl-isopropyl)-phenoxy)-methane; α,α',α"-tris-(4-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)-benzene and, in particular: 1,1,1-tri-(4-hydroxyphenyl)-ethane and bis-(3-methyl-4-hydroxyphenyl)-2-oxo-2,3-dihydroindole are employed as so-called branching agents for this purpose. Isatin-biscresol and 1,1,1-tri-(4-hydroxyphenyl)-ethane and bis-(3-methyl-4-hydroxyphenyl)-2-oxo-2,3-dihydroindole are preferably employed as branched agents.

The use of these branching agents results in branched structures. The resulting long-chain branching leads to rheological properties of the polycarbonates obtained which manifest themselves in a structural viscosity compared with linear types.

The present invention furthermore relates to a process for the preparation of the polycarbonates and copolycarbonates according to the invention, characterized in that bisphenols and, where appropriate, branching agents are dissolved in aqueous alkaline solution and are reacted with a source of carbonate, such as phosgene, optionally dissolved in a solvent, in a two-phase mixture of an aqueous alkaline solution, an organic solvent and a catalyst, preferably an amine compound. The reaction procedure may also be in several stages. Such processes for the preparation of polycarbonate are known in principle as the two-phase interface process e.g. from H. Schnell, Chemistry and Physics of Polycarbonates, Polymer Reviews, vol. 9, Interscience Publishers, New York 1964 p. 33 et seq. and from Polymer Reviews, vol. 10, "Condensation Polymers by Interfacial and Solution Methods", Paul W. Morgan, Interscience Publishers, New York 1965, chap. VIII, p. 325, and the person skilled in the art is therefore familiar with the basic conditions.

In this context, the concentration of the bisphenols in the aqueous alkaline solution is 2 to 25 wt. %, preferably 2 to 20 wt. %, particularly preferably 2 to 18 wt. % and very particularly preferably 3 to 15 wt. %. The aqueous alkaline solution comprises water, in which hydroxides of alkali or alkaline earth metals are dissolved. Sodium hydroxide and potassium hydroxide are preferred.

If phosgene is used as the source of carbonate, the volume ratio of aqueous alkaline solution to organic solvent is 5:95 to 95:5, preferably 20:80 to 80:20, particularly preferably 30:70 to 70:30 and very particularly preferably 40:60 to 60:40. The molar ratio of bisphenol to phosgene is less than 1:10, preferably less than 1:6, particularly preferably less than 1:4 and very particularly preferably less than 1:3. The concentration of the branched polycarbonates and copolycarbonates according to the invention in the organic phase is 1.0 to 25 wt. %, preferably 2 to 20 wt. %, particularly preferably 2 to 18 wt. % and very particularly preferably 3 to 15 wt. %.

The concentration of the amine compound, based on the amount of bisphenol employed, is 0.1 to 10 mol %, preferably 0.2 to 8 mol %, particularly preferably 0.3 to 6 mol % and very particularly preferably 0.4 to 5 mol %.

Bisphenols are to be understood as meaning the abovementioned diphenols, with contents of the abovementioned branching agents. The source of carbonate is phosgene, diphosgene or triphosgene, preferably phosgene. In the case where phosgene is employed, a solvent may optionally be dispensed with and the phosgene may be passed directly into the reaction mixture.

Tertiary amines, such as triethylamine or N-alkylpiperidines, may be employed as the catalyst. Trialkylamines and 4-(dimethylamino)pyridine are suitable as catalysts. Triethylamine, tripropylamine, triisopropylamine, tributylamine, triisobutylamine, N-methylpiperidine, N-ethylpiperidine and N-propylpiperidine are particularly suitable.

Halogenated hydrocarbons, such as methylene chloride and/or chlorobenzene, dichlorobenzene, trichlorobenzene or mixtures thereof, or aromatic hydrocarbons, such as e.g. toluene or xylenes, are possible as the organic solvent.

The reaction temperature may be −5° C. to 100° C., preferably 0° C. to 80° C., particularly preferably 10° C. to 70° C. and very particularly preferably 10° C. to 60° C.

Alternatively, the polycarbonates according to the invention may also be prepared by the melt transesterification process. The melt transesterification process is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964) and DE-C 10 31 512.

In the melt transesterification process, the aromatic dihydroxy compounds already described for the phase interface process are transesterified in the melt with carbonic acid diesters with the aid of suitable catalysts and optionally further additives.

Carbonic acid diesters in the context of the invention are those of the formula (6) and (7)

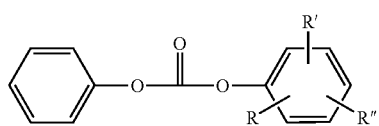

(6)

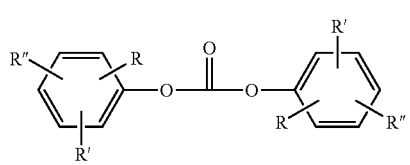

(7)

wherein

R, R' and R" independently of one another may represent H, optionally branched $C_1$-$C_{34}$-alkyl/cycloalkyl, $C_7$-$C_{34}$-alkaryl or $C_6$-$C_{34}$-aryl, for example diphenyl carbonate, butylphenyl phenyl carbonate, di-butylphenyl carbonate, isobutylphenyl phenyl carbonate, di-isobutylphenyl carbonate, tert-butylphenyl phenyl carbonate, di-tert-butylphenyl carbonate, n-pentylphenyl phenyl carbonate, di-(n-pentylphenyl)carbonate, n-hexylphenyl phenyl carbonate, di-(n-hexylphenyl)carbonate, cyclohexylphenyl phenyl carbonate, dicyclohexylphenyl carbonate, phenylphenol phenyl carbonate, di-phenylphenol carbonate, isooctylphenyl phenyl carbonate, di-isooctylphenyl carbonate, n-nonylphenyl phenyl carbonate, di-(n-nonylphenyl)carbonate, cumylphenyl phenyl carbonate, di-cumylphenyl carbonate, naphthylphenyl phenyl carbonate, di-naphthylphenyl carbonate, di-tert-butylphenyl phenyl carbonate, di-(di-tert-butylphenyl)carbonate, dicumylphenyl phenyl carbonate, di-(dicumylphenyl)carbonate, 4-phenoxyphenyl phenyl carbonate, di-(4-phenoxyphenyl)carbonate, 3-pentadecylphenyl phenyl carbonate, di-(3-pentadecylphenyl)carbonate, tritylphenyl phenyl carbonate, di-tritylphenyl carbonate, preferably diphenyl carbonate, tert-butylphenyl phenyl carbonate, di-tert-butylphenyl carbonate, phenylphenol phenyl carbonate, di-phenylphenol carbonate, cumylphenyl phenyl carbonate, di-cumylphenyl carbonate, particularly preferably diphenyl carbonate.

Mixtures of the carbonic acid diesters mentioned may also be employed. The content of carbonic acid ester is 100 to 130 mol %, preferably 103 to 120 mol %, particularly preferably 103 to 109 mol %, based on the dihydroxy compound.

Catalysts in the context of the invention which are employed in the melt transesterification process are basic catalysts as described in the literature mentioned, such as, for example, alkali and alkaline earth metal hydroxides and oxides, and also ammonium or phosphonium salts, called onium salts in the following. In this context, onium salts, particularly preferably phosphonium salts, are preferably employed. Phosphonium salts in the context of the invention are those of the formula (8)

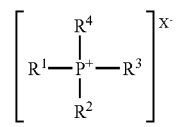

8 wherein $R^{1-4}$ can be the same or different $C_1$-$C_{10}$-alkyls, $C_6$-$C_{10}$-aryls, $C_7$-$C_{10}$-aralkyls or $C_5$-$C_6$-cycloalkyls, preferably methyl or $C_6$-$C_{14}$-aryls, particularly preferably methyl or phenyl, and $X^-$ can be an anion, such as hydroxide, sulfate, hydrogen sulfate, bicarbonate, carbonate, a halide, preferably chloride, or an alcoholate of the formula OR, wherein R may be $C_6$-$C_{14}$-aryl or $C_7$-$C_{12}$-aralkyl, preferably phenyl.

Preferred catalysts are tetraphenylphosphonium chloride, tetraphenylphosphonium hydroxide, tetraphenylphosphonium phenolate, particularly preferably tetraphenylphosphonium phenolate.

The catalysts are preferably employed in amounts of from $10^{-8}$ to $10^{-3}$ mol, based on one mol of bisphenol, particularly preferably in amounts of from $10^{-7}$ to $10^{-4}$ mol.

Further catalysts may be used, alone or optionally in addition to the onium salt, in order to increase the speed of the polymerization. These include salts of alkali metals and alkaline earth metals, such as hydroxides, alkoxides and aryloxides of lithium, sodium and potassium, preferably hydroxide, alkoxide or aryloxide salts of sodium. Sodium hydroxide and sodium phenolate are most preferred. The amounts of the cocatalyst may be in the range of from 1 to 200 ppb, preferably 5 to 150 ppb and most preferably 10 to 125 ppb, in each case calculated as sodium.

The transesterification reaction of the aromatic dihydroxy compound and the carbonic acid diester in the melt is preferably carried out in two stages. In the first stage, melting of the aromatic dihydroxy compound and the carbonic acid diester takes place at temperatures of from 80 to 250° C., preferably 100 to 230° C., particularly preferably 120 to 190° C., under normal pressure in the course of 0 to 5 hours, preferably 0.25 to 3 hours. After addition of the catalyst, the oligocarbonate is prepared from the aromatic dihydroxy compound and the carbonic acid diester by distilling off the monophenol by applying a vacuum (down to 2 mm Hg) and increasing the temperature (up to 260° C.). The main amount of vapors from the process are obtained here. The oligocarbonate prepared in this way has a weight-average molar mass $M_w$ (determined by measurement of the rel. solution viscosity in methylene chloride or in mixtures of equal amounts by weight of phenol/o-dichlorobenzene calibrated by light scattering) in the range of from 2,000 g/mol to 18,000 g/mol, preferably from 4,000 g/mol to 15,000 g/mol.

In the second stage, the polycarbonate is prepared in the polycondensation by further increasing the temperature to 250 to 320° C., preferably 270 to 295° C., under a pressure of <2 mm Hg. The remainder of vapors are removed from the process here.

The catalysts may also be employed in combination (two or more) with one another.

If alkali/alkaline earth metal catalysts are employed, it may be advantageous to add the alkali/alkaline earth metal catalysts at a later point in time (e.g. after the oligocarbonate synthesis, during the polycondensation in the second stage).

In the context of the process according to the invention, the reaction of the aromatic dihydroxy compound and the carbonic acid diester to give the polycarbonate may be carried out discontinuously or preferably continuously, for example in stirred tanks, thin film evaporators, falling film evaporators, stirred tank cascades, extruders, kneaders, simple disc reactors and high-viscosity disc reactors.

Analogously to the phase interface process, branched poly- or copolycarbonates may be prepared by using polyfunctional compounds.

Embodiments which utilize the parameters, compounds, definitions and explanations mentioned under preferred, particularly preferred or very particularly preferred or preferably etc. are preferred, particularly preferred or very particularly preferred.

However, the definitions, parameters, compounds and explanations mentioned generally or mentioned in preferred ranges in the description may also be combined with one another as desired, that is to say between the particular ranges and preferred ranges.

The polycarbonates and copolycarbonates according to the invention may be worked up and processed to any desired shaped articles in a known manner, for example by extrusion, injection molding or extrusion blow molding.

Other aromatic polycarbonates and/or other aromatic polyester carbonates and/or other aromatic polyesters may also be admixed to the polycarbonates and copolycarbonates according to the invention in a known manner, for example by compounding.

The conventional additives for these thermoplastics, such as fillers, UV stabilizers, heat stabilizers, antistatics and pigments, may also be added in the conventional amounts to the polycarbonates and copolycarbonates according to the invention; the mold release properties, the flow properties and/or the flame resistance may optionally also be improved by addition of external mold release agents, flow agents and/or flameproofing agents (e.g. alkyl and aryl phosphites and phosphates, alkyl- and arylphosphanes and low molecular weight carboxylic acid alkyl and aryl esters, halogen compounds, salts, chalk, quartz flour, glass fibres and carbon fibres, pigments and a combination thereof. Such compounds are described e.g. in WO 99/55772, p. 15-25, and in the corresponding chapters of the "Plastics Additives Handbook", ed. Hans Zweifel, 5th edition 2000, Hanser Publishers, Munich).

The polycarbonates and copolycarbonates according to the invention, optionally in a mixture with other thermoplastics, such as, for example, graft polymers based on acrylonitrile/butadieneistyrene or graft copolymers based on acrylate rubber (see, for example, the graft polymers described in EP-A 640 655) and/or conventional additives, when processed to any desired shaped articles/extrudates, may be employed in all instances where polycarbonates, polyester carbonates and polyesters which are already known are employed. Further possible uses of the polycarbonates according to the invention are:

1. Safety panes, which as is known are required in many areas of buildings, vehicles and aircraft, and also as visors of helmets.
2. Production of films, in particular films for skis.
3. Production of blow-molded articles (see also U.S. Pat. No. 2,964,794), for example 1 to 5 gallon water bottles.
4. Production of transparent sheets, in particular hollow chamber sheets, for example for covering buildings such as railway stations, greenhouses and lighting installations.
5. Production of optical data storage media.
6. For production of traffic light housings or traffic signs.
7. For production of foams (see, for example, DE-B 1 031 507).
8. For production of threads and wires (see, for example, DE-B 1 137 167 and DE-A 1 785 137).
9. As translucent plastics with a content of glass fibres for lighting purposes (see, for example, DE-A 1 554 020).
10. As translucent plastics with a content of barium sulfate, titanium dioxide and/or zirconium oxide or organic polymeric acrylate rubbers (EP-A 0 634 445, EP-A 269324) for the production of transparent and light-scattering moldings.
11. For the production of precision injection moldings, such as, for example, lens holders. Polycarbonates with a content of glass fibres which optionally additionally contain about 1 to 10 wt. % of $MoS_2$, based on the total weight, are used for this purpose.
12. For the production of optical equipment components, in particular lenses for photographic and film cameras (see, for example, DE-A 2 701 173).
13. As light transmission carriers, in particular as light conductor cables (EP-A 0 089 801).
14. As electrical insulating materials for electrical conductors and for plug housings and plug connectors.

15. Production of mobile telephone housings with improved resistance to perfume, shaving lotion and skin perspiration.
16. Network interface devices.
17. As a carrier material for organic photoconductors.
18. For the production of lamps, e.g. searchlights, as so-called headlamps, light-diffusing panes or internal lenses, as well as long-distance lamps.
19. For medical uses, such as e.g. oxygenators, dialyzers.
20. For foodstuffs uses, such as e.g. bottles, utensils and chocolate molds.
21. For uses in the automobile field where contact with fuels and lubricants may occur, such as, for example, bumpers, optionally in the form of suitable blends with ABS or suitable rubbers.
22. For sports articles, such as e.g. slalom poles or ski boot buckles.
23. For household articles, such as e.g. kitchen sinks and letterbox housings.
24. For housings, such as e.g. electrical distribution boxes
25. Housings for electric toothbrushes and hairdryer housings.
26. Transparent washing machine portholes with improved resistance to the wash solution.
27. Safety glasses, visors or optical corrective glasses.
28. Lamp covers for kitchen equipment with improved resistance to kitchen fumes, in particular oil vapors.
29. Packaging films for medicaments.
30. Chip boxes and chip supports.
31. For other uses, such as e.g. fattening stable doors or animal cages.
32. Safety helmets This Application likewise provides the shaped articles and moldings and extrudates from the polymers according to the invention.

EXAMPLES

A) Preparation of Bisphenol of the Formula (1)

Example 1

Preparation of N-phenylisatin

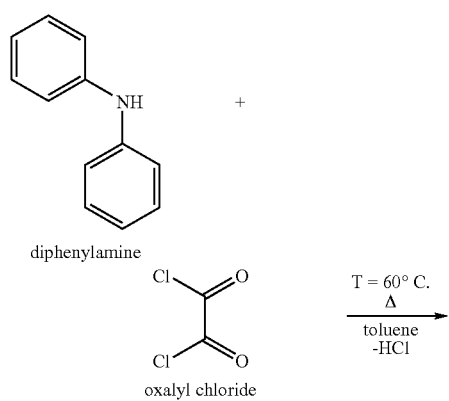

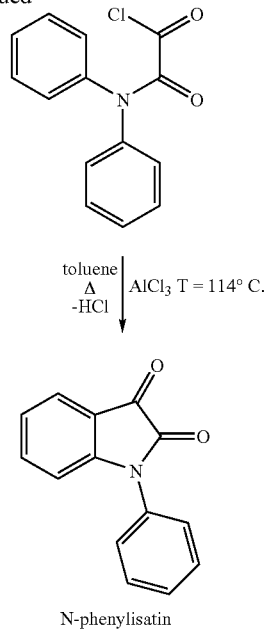

660 g (5.20 mol) oxalic acid dichloride, dissolved in 1,600 ml anhydrous toluene, are initially introduced into a previously heated apparatus at room temperature.

798 g (4.72 mol) diphenylamine, likewise dissolved in 1,200 ml anhydrous toluene, are pumped in by means of a Telab pump (setting: 10 strokes/minute at 30%) in the course of 1.5 hours under intensive stirring. During this procedure, the reaction batch is thermostatically controlled at 45° C. The maximum temperature reached due to the heat of reaction is 50° C.

Directly after the diphenylamine solution has been pumped in, the progress of the reaction is checked by means of gas chromatography (GC) at the intermediate stage before the cyclization (molecular weight 259.69 g/mol; conversion 98.4 area %; determination of the retention time by prior GC-MS). To carry out the cyclization, 15 g of dry aluminium chloride are added. The mixture is then heated up to the reflux temperature. The temperature is maintained for 3 hours, the HCl gas formed being passed into an alkaline destruction reservoir.

After the end of the reaction, a reaction progress of greater than 90 area % of the desired end product N-phenylisatin (molecular weight 223.23 g/mol) is determined by means of GC.

Working Up:

The reaction mixture is precipitated in water, the crude product is filtered off with suction and washed 3 times with distilled water, filtered off under high suction again and then dried at 70° C. in a vacuum drying cabinet.

Yield:

977.1 g of an orange-coloured solid (92.7% of theory) having a melting point of 138° C. are obtained (GC purity of 98.7%).

Analysis:
GC-MS: molecular weight 223 g/mol
$^1$H-NMR (400 MHz, TMS CDCl$_3$) δ=7.71-7.69 (d, 1H), 7.58-7.52 (m, 3H), 7.47-7.41 (m, 3H), 7.19-7.15 (t, 1H), 6.91-6.88 (d, 1H).

Example 2

Bisphenol of the Formula (1)

Preparation of
3,3-bis(4-hydroxyphenyl)-1-phenyl-1H-indol-2-one

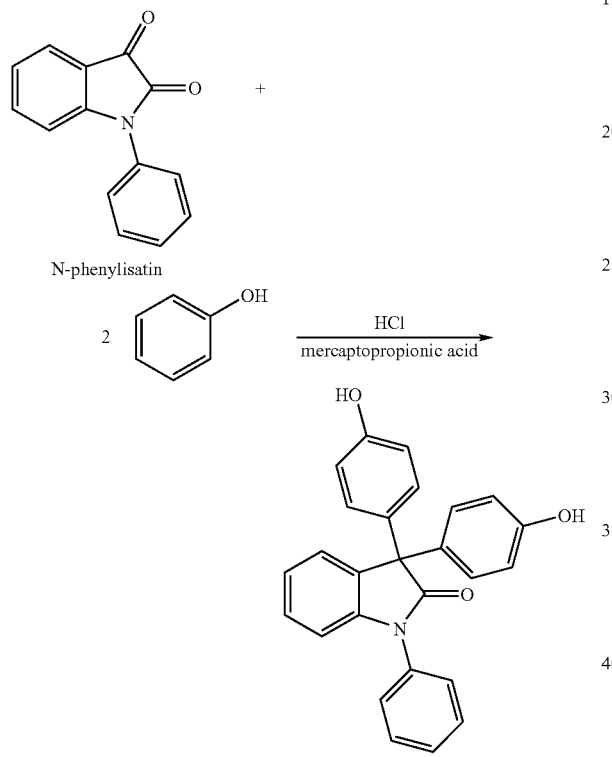

1,400 g (6.27 mol) N-phenylisatin from Example 1, 3,541 g (37.6 mol) molten, freshly distilled phenol and 7 g (0.66 mol) 3-mercaptopropionic acid (cocatalyst) are initially introduced into the apparatus, which has been rendered inert, and are heated to 40-45° C.

Hydrogen chloride gas is now cautiously passed into this red-brown homogeneous solution for 25 minutes, with moderate stirring, during which the temperature rises to 67° C.

The dark brown batch is then cooled to room temperature and the beige suspension formed is filtered with suction.

Analysis of the product formed:

1st GC control:
4.0 area % phenol
14.2 area % of a product isomer 2,2-bis(4-hydroxyphenyl)-1-phenyl-1H-indol-2-one
81.1 area % of the product 3,3-bis(4-hydroxyphenyl)-1-phenyl-1H-indol-2-one Washing the crude product 8 times with 1 litre of methylene chloride each time leads to the following product:
0.03 area % phenol
2.5 area % of the isomer 2,2-bis(4-hydroxyphenyl)-1-phenyl-1H-indol-3-one
97.2 area % of the product 3,3-bis(4-hydroxyphenyl)-1-phenyl-1H-indol-2-one Yield after drying:
830 g of a slightly yellowish solid (33.6% of theory).

Analysis:
GC-MS: in each case molecular weight 537 g/mol after derivatization as a trimethylsilyl adduct
$^1$H-NMR (400 MHz, TMS, DMSO) δ=9.47 (s, 2H), 7.60-7.57 (t, 2H), 7.50-7.45 (m, 3H), 7.30-7.35 (d, 1H), 7.28-7.20 (t, 1H), 7.15-7.10 (t, 1H), 7.09-7.04 (d, 4H), 6.81-6.79 (d, 1H), 6.77-6.71 (d, 4H).

*) Isomer Reaction:
The compound 2,2-bis(4-hydroxyphenyl)-1-phenyl-1H-indol-3-one is formed as a secondary component by condensation of N-phenylisatin with phenol.

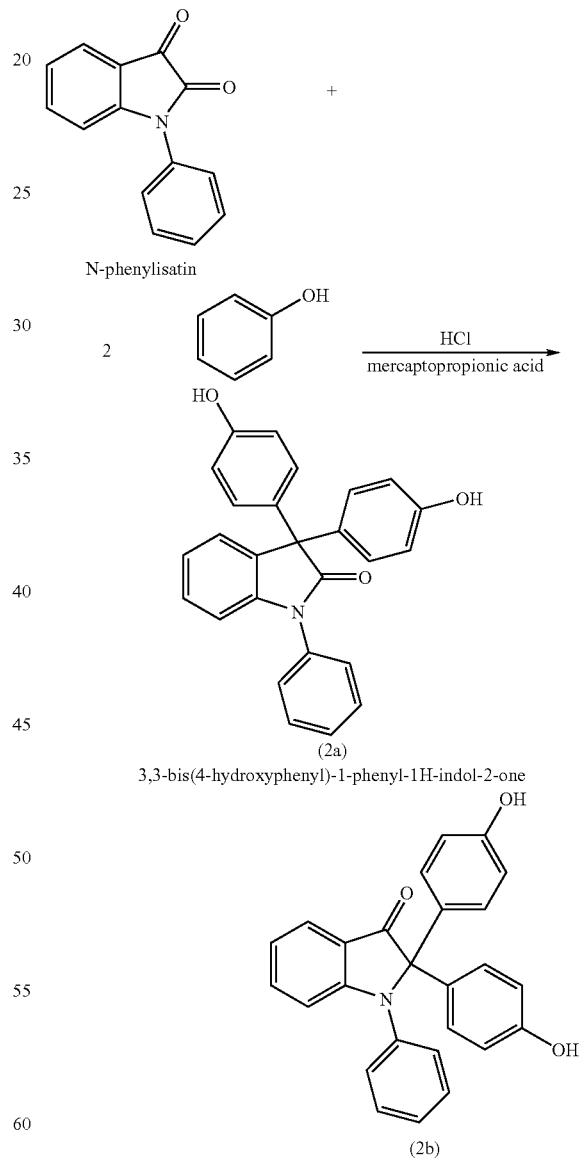

Analysis
The analytical determination of the structure of the product obtained (Example 2) after preparation of the sample (conversion into the trimethylsilyl derivative) was carried out by means of gas chromatography-mass spectrometry (GC-MS).

The compound (2a) as the trimethylsilyl derivative has a molecular weight of 537 g/mol. In the GC a further peak is found at a shorter retention time, which according to analysis by means of gas spectrometry likewise has, as the trimethylsilyl derivative, the molecular weight of 537 g/mol. This isomer has the structure according to Example (2b). Furthermore, it was possible to demonstrate by different fragmentation in the mass spectrum that this structure is unambiguously the structure (2b) and not the structure of the bisphenol of the formula (2c).

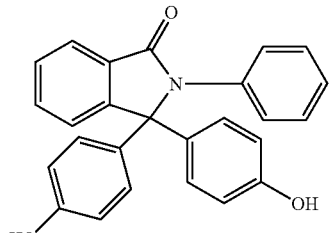

(2c)

B) Preparation of Polycarbonate

Example 3

Preparation of a copolycarbonate (50/50 mol %) from bisphenol A (BPA) and the bisphenol according to the invention according to Example 2 (3,3-bis(4-hydroxyphenyl)-1-phenyl-1H-indol-2-one (97.2% according to GC), 2,2-bis(4-hydroxyphenyl)-1-phenyl-1H-indol-3-one (2.5% according to GC)).

In order to obtain sufficient amounts of bisphenol of the example for a continuous process, the batch of Example 2 was repeated several times.

A copolycarbonate was obtained by the phase interface process by means of a laboratory continuous unit. The following synthesis conditions and reaction parameters/meterings (in each case the amount per hour) were maintained:

- 15% strength sodium bisphenolate solution containing a mixture of bisphenol A and the isomer mixture from Example 2 (50/50 mol %)
- 2.1 mol sodium hydroxide solution per mol bisphenol in the sodium bisphenolate solution
- 1.40 mol phosgene per mol bisphenol (or 1.382 mol phosgene per mol bisphenol+0.5 mol chain terminator)
- temperature 30° C. during the phosgenation
- p-tert-butylphenol (BUP) as the chain terminator
- 3.6 mol % chain terminator per mol bisphenol
- 1 mol % N-ethylpiperidine (EPP) per mol bisphenol as a catalyst (7.4% strength solution in the solvent mixture methylene chloride/chlorobenzene (50/50 wt. %)
- 15.0% strength polycarbonate solution in the solvent mixture methylene chloride/chlorobenzene (50/50) as the desired organic phase
- weight of the copolycarbonate formed 156 g/h The following amounts per hour are reacted in this context: 943.3 g of a 15% strength solution consisting of 52.0 g bisphenol A, 89.5 g bisphenol from Example 5, dissolved in an alkaline aqueous phase of 720 g water and 81.8 g concentrated sodium hydroxide solution (46.7% strength), are combined together with 736.9 g of a solvent mixture consisting of methylene chloride/chlorobenzene (50/50) which contain 63.0 g phosgene. To regulate the molecular weight, after the phosgenation 2.461 g BUP in 140.6 g of the solvent mixture methylene chloride/chlorobenzene (50/50) are added. To maintain the alkaline pH of approx. 12-13, 66.0 g concentrated sodium hydroxide solution (46.7% strength) are moreover metered in. At the rear end of the dwell zone of the apparatus, 0.515 g EPP, dissolved in 6.44 g of the solvent mixture methylene chloride/chlorobenzene (50/50), is added.

Reaction Equation

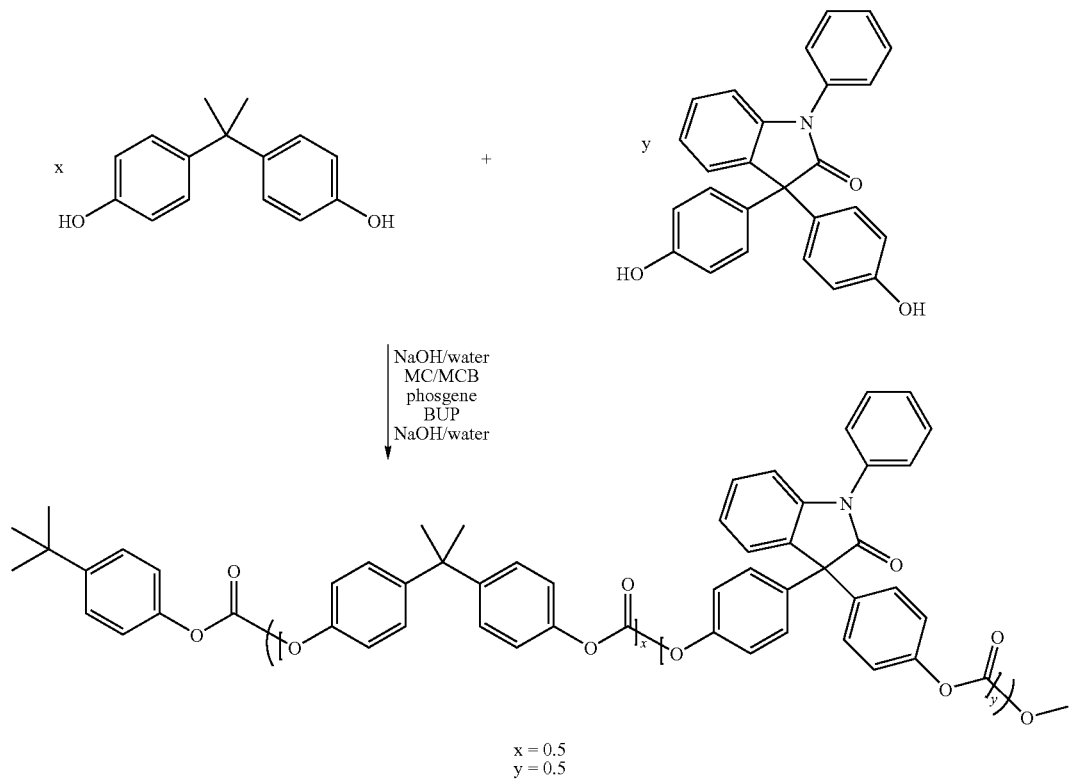

x = 0.5
y = 0.5

Due to the isomer 2,2-bis(4-hydroxyphenyl)-1-phenyl-1H-indol-3-one formed during the preparation of Example 2, the corresponding content of the isomer is contained in y=0.5.

After the organic copolycarbonate solution obtained has been washed, the solvent mixture is evaporated off in vacuo, a solid thereby being obtained, which is comminuted and homogenized.

Analysis

Relative solution viscosity in methylene chloride at 25° C. (concentration 5 g/l): 1.168

Gel permeation chromatography (GPC, calibration by means of BPA polycarbonate, UV detector 254 nm):
Mn=8,417 g/mol
Mw=18,666 g/mol
D=2.22 (polydispersity)

Oligomer content in the range of 300-1,500 g/mol: 2.08%

Glass transition temperature (DSC after 2nd heating up of 50-280° C., 20° C./min heating up rate): 210° C.

Examples 4-8

In order to obtain sufficient amounts of polycarbonate in a laboratory continuous unit (limited capacity), the process according to Example 3 was carried out several times. The polycarbonates obtained therefrom are characterized as follows:

Example 4

Relative solution viscosity in methylene chloride at 25° C. (concentration 5 g/l): 1.202

Gel permeation chromatography (GPC, calibration by means of BPA polycarbonate, UV detector 254 nm):
Mn=10,497 g/mol
Mw=22,972 g/mol
D=2.19

Oligomer content in the range of 300-1,500 g/mol: 1.41%

Glass transition temperature (DSC after 2nd heating up of 50-280° C., 20° C./min heating up rate): 210° C.

Example 5

Relative solution viscosity in methylene chloride at 25° C. (concentration 5 g/l): 1.215

Gel permeation chromatography (GPC, calibration by means of BPA polycarbonate, UV detector 254 nm):
Mn=10,052 g/mol
Mw=24,666 g/mol
D=2.23

Oligomer content in the range of 300-1,500 g/mol: 1.41%

Glass transition temperature (DSC after 2nd heating up of 50-280° C., 20° C./min heating up rate): 212° C.

Example 6

Relative solution viscosity in methylene chloride (concentration 5 g/l):
1.162/1.162 (duplicate determination)

Gel permeation chromatography (GPC, calibration by means of BPA polycarbonate, UV detector 254 nm):
Mn=8,280 g/mol
Mw=16,777 g/mol
D=2.03

Oligomer content in the range of 300-1,500 g/mol: 1.82%

Glass transition temperature (DSC after 2nd heating up of 50-280° C., 20° C./min heating up rate): 207° C.

In order to obtain sufficient amounts of polycarbonate in a laboratory continuous unit (limited capacity), the process according to Example 3 was carried out several times. The polycarbonates obtained therefrom are characterized as follows:

Example 7

Relative solution viscosity in methylene chloride (concentration 5 g/l):
1.165/1.166 (duplicate determination)

Gel permeation chromatography (GPC, calibration by means of BPA polycarbonate, UV detector 254 nm):
Mn=8,633 g/mol
Mw=17,407 g/mol
D=2.02

Oligomer content in the range of 300-1,500 g/mol: 1.65%

Glass transition temperature (DSC after 2nd heating up of 50-280° C., 20° C./min heating up rate): 204° C.

Example 8

Relative solution viscosity in methylene chloride (concentration 5 g/l):
1.166/1.165 (duplicate determination)

Gel permeation chromatography (GPC, calibration by means of BPA polycarbonate, UV detector 254 nm):
Mn=8,251 g/mol
Mw=17,023 g/mol
D=2.06

Oligomer content in the range of 300-1,500 g/mol: 1.86%

Glass transition temperature (DSC after 2nd heating up of 50-280° C., 20° C./min heating up rate): 204° C.

Example 9

All the copolycarbonate fractions from Example 3-8 are combined. The copolycarbonate obtained in this way is characterized as follows:

Relative solution viscosity in methylene chloride (concentration 5 g/l): 1.174

Gel permeation chromatography (GPC, calibration by means of BPA polycarbonate, UV detector 254 nm):
Mn=9,004 g/mol
Mw=18,029 g/mol
D=2.00

Oligomer content in the range of 300-1,500 g/mol: 1.44%

Glass transition temperature (DSC after 2nd heating up of 50-280° C., 20° C./min heating up rate): 207° C.

C) Testing of the Adhesion of the Copolycarbonate to Metal

The copolycarbonate according to Example 9 is extruded to granules and, after drying at 130° C. for 4 hours, injection molded to circular test specimens (diameter: 2 cm, thickness 3 mm). A layer of 200 nm aluminium is sputtered on to the test specimens thus obtained. An adhesive tape type 3M 853 from 3M is applied to this metal layer. To test the metal adhesion, this adhesive tape is peeled off again immediately after application.

Compared with an analogously metallized specimen of injection-molded copolycarbonate of 65 mol % bisphenol A and 35 mol % bisphenol TMC having a relative solution viscosity of 1.26 (measured in methylene chloride at 25° C. and a concentration of 5 g/l,) an improved adhesion of the aluminium to the copolycarbonate surface was found.

Test specimens according to the invention: after peeling off the adhesive tape, 19% of the original aluminium area remains on the polycarbonate substrate Comparison test specimens: On the comparison specimen, after peeling off the adhesive tape no residue at all of the aluminium could be detected. The aluminium deposit adhered completely to the adhesive tape.

Although the invention has been described in detail in the foregoing for the purpose of illustration, it is to be understood that such detail is solely for that purpose and that variations may be made therein by those skilled in the art without departing from the spirit and scope of the invention except as it may be limited by the Claims.

What is claimed:

1. A (co)polycarbonate the molecular structure of which contains units derived from bisphenols conforming formulae $(1a_1)$, $(1b_1)$

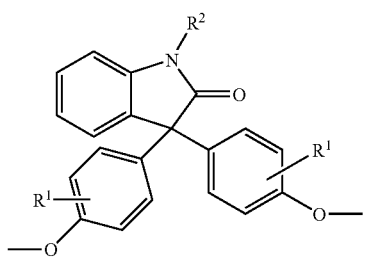

(1a₁)

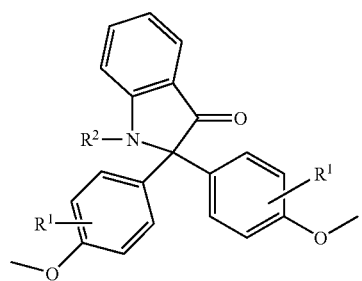

(1b₁)

in which
$R^1$ independently of one another represents hydrogen or a $C_1$-$C_{10}$-alkyl radical and
$R^2$ represents $C_1$-$C_{10}$-alkyl, furthermore or phenyl or benzyl in each case unsubstituted or substituted by at least one member selected from the group consisting of hydrogen and/or $C_1$-$C_{10}$-alkyl.

2. A (co)polycarbonate according to claim 1 wherein the molecular structure further contains up to 95 mol-% of units derived from bisphenols conforming to formula (2)

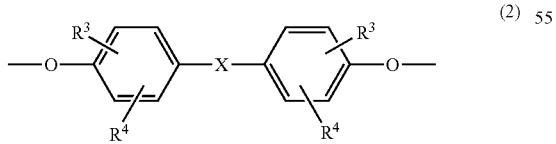

(2)

in which
$R^3$ and $R^4$ independently of one another represent hydrogen, $C_1$-$C_{18}$-alkyl, $C_1$-$C_{18}$-alkoxy, halogen, in each case optionally substituted aryl or aralkyl
X represents a single bond, —SO₂—, —CO—, —O—, —S—, $C_1$- to $C_6$-alkylene, $C_2$- to $C_5$-alkylidene or $C_5$- to $C_6$-cycloalkylidene, which can be substituted by $C_1$- to $C_6$-alkyl, or $C_6$- to $C_{12}$-arylene, which can optionally be fused with further aromatic rings containing hetero atoms
said mol-% being in relation to the total moles of bisphenols.

3. The (co)polycarbonate according to claim 2 containing up to 80 mol-% of units derived from bisphenols conforming to formula (2).

4. The (co)polycarbonate according to claim 2 containing 40-60 mol-% diphenol of formula (1) and 60-40 mol-% of formula (2).

5. The (co)polycarbonate according to claim 2 containing 55-45 mol-% diphenol of formula (1) and 45-55 mol-% of formula (2).

6. The (co)polycarbonate of claim 2, wherein said X is a member selected from the group consisting of —SO₂—, —CO—, —O—, —S—, $C_1$ to $C_6$-alkylene, $C_2$- to $C_5$-alkylidene, $C_5$- to $C_6$-cycloalkylidene, said member substituted by $C_1$- to $C_6$-alkyl radical.

7. The (co)polycarbonate according to claim 1, wherein in the formulae $(1a_1)$ and $(1b_1)$ $R^1$ denotes hydrogen or methyl and $R^2$ denotes phenyl or benzyl.

8. The (co)polycarbonate according to claim 2, wherein the bisphenol of formula (2) is at least one member selected from the group consisting of bisphenol A, 4,4'-dihydroxybiphenyl, bisphenol M and bisphenol TMC.

9. An article of manufacture comprising to (co)polycarbonates according to claim 1.

10. The article of claim 9 wherein at least some of its surface is metallized.

11. A thermoplastic molding compositions comprising to (co)polycarbonate according to claim 1.

12. In the process of preparing (co)polycarbonates from the carbonate precursor and at least one aromatic dihydroxy compound by the phase interface process, the improvement comprising using compounds of the formulae (1a) and (1b)

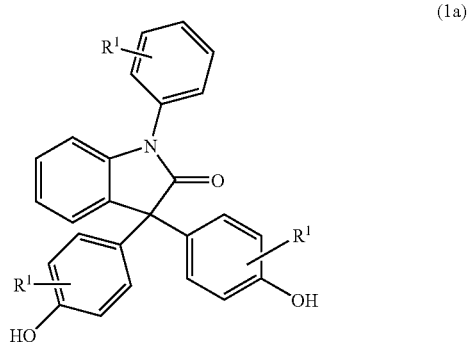

(1a)

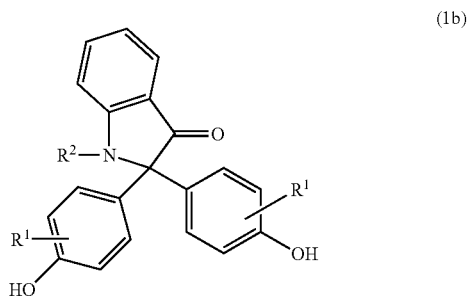

(1b)

in which
R¹ independently of one another represents hydrogen or a C₁-C₁₀-alkyl radical and R² represents C₁-C₁₀-alkyl, phenyl or benzyl radicals,
as the aromatic dihydroxy compound
R² represents linear or branched C₁-C₁₀-alkyl or in each ease optionally unsubstituted or substituted phenyl or benzyl, the radicals mentioned for R¹ being preferred substituents for phenyl and benzyl.

13. A mixture of compounds conforming to formulae (1a) and (1b)

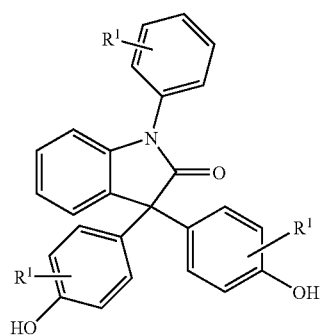

(1a)

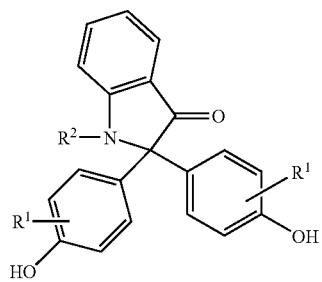

(1b)

in which

R¹ independently of one another represents hydrogen or C₁-C₁₀-alkyl and

R² represents C₁-C₁₀-alkyl, furthermore phenyl or benzyl, in each case unsubstituted or substituted by at least one member selected from the group consisting of hydrogen and C₁-C₁₀-alkyl.

14. The (co)polycarbonate according to claim 2, wherein in the formulae (1a₁) and (1b₁) R¹ denotes hydrogen or methyl and R² denotes phenyl or benzyl.

15. The (co)polycarbonate according to claim 5, wherein in the formulae (1a₁) and (1b₁) R¹ denotes hydrogen or methyl and R² denotes phenyl or benzyl.

16. The (co)polycarbonate according to claim 6, wherein in the formulae (1a₁) and (1b1) R¹ denotes hydrogen or methyl and R² denotes phenyl or benzyl.

17. The (co)polycarbonate according to claim 8, wherein in the formulae (1a₁) and (1b₁) R¹ denotes hydrogen or methyl and R² denotes phenyl or benzyl.

18. The (co)polycarbonate according to claim 12, wherein in the formulae (1a₁) and (1b₁) R¹ denotes hydrogen or methyl and R² denotes phenyl or benzyl.

19. The (co)polycarbonate according to claim 13, wherein in the formulae (1a₁) and (1b₁) R¹ denotes hydrogen or methyl and R² denotes phenyl or benzyl.

20. The (co)polycarbonate according to claim 18, containing 55-45 mol-% diphenol of formula (1) and 45-55 mol-% of formula (2).

* * * * *